United States Patent
Derzon et al.

(10) Patent No.: US 10,620,326 B1
(45) Date of Patent: Apr. 14, 2020

(54) COMPACT RADIATION DETECTOR

(71) Applicant: National Technology & Engineering Solutions of Sandia, LLC, Albuquerque, NM (US)

(72) Inventors: Mark S. Derzon, Albuquerque, NM (US); Randolph R. Kay, Albuquerque, NM (US); Paul C. Galambos, Albuquerque, NM (US); Ronald F. Renzi, Tracy, CA (US); Liam D. Claus, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 43 days.

(21) Appl. No.: 15/920,113

(22) Filed: Mar. 13, 2018

Related U.S. Application Data

(60) Division of application No. 14/192,595, filed on Feb. 27, 2014, now Pat. No. 9,993,894, which is a continuation-in-part of application No. 13/559,370, filed on Jul. 26, 2012, now Pat. No. 8,912,502, which is a continuation-in-part of application No. 12/046,041, filed on Mar. 11, 2008, now abandoned.

(60) Provisional application No. 60/894,700, filed on Mar. 14, 2007.

(51) Int. Cl.
| | |
|---|---|
| *G01T 3/06* | (2006.01) |
| *G06T 15/00* | (2011.01) |
| *G01T 3/00* | (2006.01) |
| *G01T 3/08* | (2006.01) |

(52) U.S. Cl.
CPC ............... *G01T 3/06* (2013.01); *G01T 3/008* (2013.01); *G01T 3/08* (2013.01); *G06T 15/00* (2013.01)

(58) Field of Classification Search
CPC ........... H01L 27/0688; H01L 27/11578; H01L 27/11551; G01N 2223/501; G01S 15/8993
See application file for complete search history.

(56) References Cited

U.S. PATENT DOCUMENTS

| | | |
|---|---|---|
| 3,290,523 A | 12/1966 | Foreman |
| 4,795,910 A | 1/1989 | Henderson et al. |
| 7,157,719 B2 | 1/2007 | Martloff |
| 7,902,513 B2 * | 3/2011 | Kub ........................ G01T 3/08 250/370.05 |
| 2003/0213917 A1 | 11/2003 | Menlove et al. |
| 2007/0018110 A1 | 1/2007 | McGregor et al. |

(Continued)

OTHER PUBLICATIONS

Aprile and Doke, "Liquid xenon detectors for particle physics and astrophysics", Reviews of Modern Physics, pp. 2053-2097, vol. 82, Jul.-Sep. 2010.

(Continued)

*Primary Examiner* — Kenneth J Malkowski
(74) *Attorney, Agent, or Firm* — Martin I. Finston

(57) ABSTRACT

Apparatus for detecting radiation includes a sensor medium disposed within a cavity in a silicon-based substrate. An electrode arrangement is provided for collecting charge generated within the sensor medium by interactions with impinging radiation and drifted through the sensor medium. The electrode arrangement is constituted, in part, by a silicon portion of the substrate that is doped to increase its electrical conductivity and that defines part of the cavity wall.

13 Claims, 16 Drawing Sheets

(56) References Cited

U.S. PATENT DOCUMENTS

2008/0191140 A1     8/2008    McDevitt et al.
2011/0108738 A1     5/2011    Doty et al.

OTHER PUBLICATIONS

Bellinger et al., "Characteristics of the Stacked Microstructured Solid-State Neutron Detector", Hard X-Ray, Gamma-Ray, and Neutron Detector Physics XII. Edited by Burger, Arnold; Franks, Larry A.; James, Ralph B. Proceedings of the SPIE, vol. 7805, article id. 78050N, 16 pp. (2010).

Crane and Baker, "Neutron Detectors" in Passive Nondestructive Assay of Nuclear materials, ed. By D. Reilly et al., Nuclear Regulatory Commission, NUREG/CR-5550, pp. 379-404; Mar. 1991.

Doty et al., "Use of Metal Organic Fluors for Spectral Discrimination of Neutrons and Gammas," Sandia Report, SAND2010-6724, Unlimited Release, Printed Sep. 2010.

Kiff, Scott D., "Improving Spectroscopic Performance of a Coplanar-Anode High-Pressure Xenon Gamma-Ray Spectrometer", IEE Transactions on Nuclear Science, vol. 54, No, 4, pp. 1263-1270, Aug. 2007.

Martin et al., "Simulation of high-pressure micro-capillary 3 He counters", J. Phys. G: Nucl. Part, Phys. 35, 115193 (14 pp). (2008).

McGregor et al., "Designs for Thin-Film-Coated Semiconductor Thermal Neutron Detectors", Nuclear Science Symposium Conference Record, 2001 IEEE (vol. 4), pp. 2454-2458, San Diego, California Nov. 4-10, 2001.

McGregor et al., "Micro-Structured High-Efficiency Semiconductor Neutron Detectors", Nuclear Science Symposium Conference Record, 2008, NSS'08. IEEE, pp. 445-448, Dresden, Germany, Oct. 19-25, 2008.

Oosterbroek, et al., "Fabrication and mechanical testing of glass chips for high-pressure synthetic or analytical chemistry," Mocrosyst. Technol. 2006; col. 12; pp. 450-454; published Sep. 7, 2005.

Tepper et al., "Xenon Ionization Detector for Cone Penetrometer Applications", http://asaha.com/ebook/xMTc2NDg4/Xenon-Ionization-Detector-for-Cone-Penetrometer-Applications.html Oct. 19, 2013.

Zhang, F. et al., "A Prototype Three-Dimensional Position Sensitive CdZnTe Detector Array", IEEE Transactions on Nuclear Science, vol. 54, No. 4, pp. 843-848, Aug. 2007.

Zhang, F. et al., "Performance of 3-D Position Sensitive CdZnTe Detectors for Gamma-Ray Energies above 1MeV", Nuclear Science Symposium Conference Record (NSS/MIC), 2009 IEEE, pp. 2012-2016, Orlando, Florida, Oct. 24, 2009-Nov. 1, 2009.

Zhang and Seifert, "Three-Dimensional Position Sensitive CdZnTe Detector Array for PNNL", Nuclear Science Symposium Conference Record, 2006 IEE, vol. 6, pp. 3767-3771, San Diego, California, Oct. 29, 2006-Nov. 1, 2006.

Zhon and Sturm, "Characteristics of Depth Serrsirrg Coplanar-Grid CdZnTe Detectors", Nuclear Science Symposium Conference Record, 2003 IEEE, vol. 5, pp. 3601-3605, Oct. 19-25, 2003.

"3D Neutron Detectors" (2007), pp. 1-108 to Uher, available at https://ojs.ujf.cas.cz/~wagner/dokprojekt/phdprace/josefuher.pdf (hereinafter "Uher").

* cited by examiner

COMPACT RADIATION DETECTOR

CROSS-REFERENCE TO RELATED APPLICATIONS

This is a divisional of U.S. patent application Ser. No. 14/192,595, filed on Feb. 27, 2014, which application is commonly owned herewith and the entirety of which is incorporated herein by reference. The aforesaid application Ser. No. 14/192,595 is a continuation-in-part of U.S. patent application Ser. No. 13/559,370, filed on Jul. 26, 2012 and issued on Dec. 16, 2014 as U.S. Pat. No. 8,912,502, which patent is commonly owned herewith and the entirety of which is incorporated herein by reference. The aforesaid application Ser. No. 13/559,370 is a continuation-in-part of U.S. patent application Ser. No. 12/046,041, filed on Mar. 11, 2008 and now abandoned, which claims the benefit of U.S. Provisional Patent Application Ser. No. 60/894,700, filed on Mar. 14, 2007.

The subject matter of this application is related to the subject matter of U.S. patent application Ser. No. 14/192,688, filed on common date with the filing hereof by M. S. Derzon et al. under the title "Multiple-Mode Radiation Detector," and issued on Aug. 25, 2015 as U.S. Pat. No. 9,116,249, which patent is commonly owned herewith.

GOVERNMENT CONTRACT REFERENCE

This invention was made with Government support under Contract No. DE-NA0003525 awarded by the United States Department of Energy/National Nuclear Security Administration. The U.S. Government has certain rights in the invention.

TECHNICAL FIELD

The present invention is directed generally to radiation detectors, and, more particularly, to detectors for neutrons and gamma rays or x-rays. The invention also has potential applications for the detection of alpha and beta radiation, which therefore should not be excluded from its scope.

BACKGROUND OF THE INVENTION

Various tradeoffs exist in the design of radiation sensors. Some of the desirable attributes of a radiation sensor that are affected by tradeoffs include cost, sensitivity, spectral discrimination, discrimination of one particle type from another, spatial discrimination or imaging ability, particle tracking, and energy consumption. Although radiation sensors have been in development for many years, there remains a need for new designs that achieve favorable tradeoffs among these and other attributes. Two rapidly developing fields that have greatly increased the demand for new sensor designs are radiological surveillance and radiological medicine.

One recent design approach, motivated in particular by the need for new sensors for radiological surveillance, is described in our U.S. Pat. No. 8,912,502, cited above. Embodiments described there are neutron detectors using, e.g., helium-3 as a sensing medium. Features are described that improve the rejection of gamma-ray-induced background noise, reduce the total helium-3 requirement, and provide for increased spatial resolution and directional discrimination.

One of the embodiments we described was a thermal neutron detector in which a high pressure ion chamber was formed in a dielectric material. First and second electrodes were formed in the high pressure ion chamber, which was filled with a neutron absorbing material to chamber pressures up to several hundred atm. and was surrounded at least in part by a neutron moderating material. The high pressure ion chamber had a pair of parallel, substantially planar surfaces on which respective first and second electrodes were formed.

Another of the embodiments we described was a neutron detector with monolithically integrated readout circuitry. In that embodiment, the ion chamber was formed in a bonded semiconductor die that included an etched semiconductor substrate bonded to an active semiconductor substrate. The first and second electrodes were formed in the ion chamber and were electrically coupled to readout circuitry formed in a portion of the active semiconductor substrate.

Although useful, the above-described design approach still leaves room for extensions, e.g. for alpha, beta, and gamma particle detection, and for competing approaches that may provide further capabilities or that may be more optimal for certain applications.

SUMMARY OF THE INVENTION

Our invention in one aspect is an apparatus for detecting radiation. In embodiments, at least one sensor is disposed on a surface of a wafer-like substrate. At least one sensor medium is fixed relative to the substrate, optically or electrically coupled to the sensor, and separated from the sensor by no more than the substrate thickness. An electronic signal-processing circuit is connected to the sensor and configured to produce an output when the sensor is stimulated by a product of an interaction between the sensor medium and impinging radiation.

The sensor is configured to collect, from the sensor medium, charge and/or light produced within the sensor medium by interactions with impinging radiation. In some embodiments, at least one sensor is a photodiode configured to collect light from the sensor medium. In some embodiments, at least one sensor is an electrode arrangement configured to collect charge generated in and drifted through the sensor medium. The collected charge may, e.g., be primary charge generated directly by impinging radioactive particles, or it may also include, e.g., secondary charges generated by interactions between the primary charges and the same sensor medium.

In embodiments, a plurality of sensors are disposed on the substrate surface and the sensor medium is disposed within a laterally extending array of cavities, each of which is aligned with at least one respective sensor. In some embodiments, the substrate is an SOI substrate comprising a device layer and a handle layer, the sensors are disposed on the device layer, and the cavities are formed in the handle layer. In other embodiments, the sensors are disposed on a silicon or SOI substrate, the cavities are defined between said substrate and a further silicon or SOI substrate, and the two substrates are bonded together.

In embodiments, the signal-processing circuit comprises a respective preamplifier for each said sensor; and said preamplifiers are separated from their respective sensors by no more than the substrate thickness.

In embodiments, a rectangular array of sensors is fixed in an integral unit with the sensor medium, and wherein said integral unit is one of two or more similar units arranged in a vertical stack. In embodiments, at least one motherboard containing processing circuitry is connected to one or more output ports on each of the respective integral units. In embodiments, each said integral unit includes an electronic circuit configured to provide signal output that comprises two-dimensional image information, and wherein at least one motherboard includes an electronic circuit configured to process the two-dimensional information from the integral units so as to produce output that comprises three-dimensional image information.

In embodiments, two or more sensor media are arranged such that at least a first sensor medium is separated from the sensor by no more than the substrate thickness and at least a second sensor medium is separated from the sensor by a greater distance than the first sensor medium. In embodiments, sensor media are disposed in a stack of layers such that at least some impinging radioactive particles can penetrate one or more preceding layers before stopping in a layer of the stack. In embodiments, the electronic signal-processing circuit is configured to discriminate radioactive particles based on the number of sensor-medium layers that are penetrated.

In embodiments, two or more sensors are configured to respond to different products of interactions between the sensor medium and impinging radiation, and the electronic signal-processing circuit is configured to further discriminate radioactive particles based on differences in the interaction products.

In embodiments, the wafer-like substrate comprises an SOI substrate having a silicon layer and a silicon oxide layer; the sensor medium is disposed within a cavity; the sensor comprises a pair of electrodes positioned on opposing sides of the cavity; the silicon oxide layer provides electrical isolation between the pair of electrodes; and at least one of the electrodes is wholly or partly defined as a portion of the silicon layer that has been doped to increase its electrical conductivity.

In another aspect, our invention is a radiation detection apparatus in which at least one sensor is disposed on a surface of a wafer-like substrate. At least one sensor medium cavity is fixed relative to the substrate and separated from the sensor by no more than the substrate thickness. A duct arrangement is provided for filling the cavity with, and emptying the cavity of, an interchangeable sensor medium.

Any of various sensor media may be used in specific embodiments of the invention. Exemplary sensor media include, without limitation, hydrogen, deuterium, helium, krypton, xenon, boron, cadmium telluride, cadmium zinc telluride, thorium oxide, uranium oxide, propane, methane, and thallium bromide.

DETAILED DESCRIPTION OF THE INVENTION

We will first briefly review the two abovesaid detector embodiments of U.S. Pat. No. 8,912,502. We will then describe further ideas and developments and exemplary embodiments thereof.

It should be noted in this regard that although the embodiments described in U.S. Pat. No. 8,912,502 are directed specifically to neutron detection, they are specific implementations of a more general idea for a charge-collecting device that in its various implementations can detect radioactive particles of various kinds, including gamma ray and x-ray photons, neutrons, and alpha and beta particles, by collecting primary charges generated by the particle interactions in the sensor medium. As understood in such a broad aspect, the sensor medium may have any of various compositions, including without limitation low-atomic-number gases, noble gases, and semiconductors. Indeed, in one broad aspect the invention may be regarded, conceptually, as a platform containing a sensor medium that for different embodiments can be changed to provide, within the same architectural framework, a scalable detection volume and variable capabilities. As will be seen below, certain specific embodiments offer features such as low-capacitance coupling to the electronic detection circuitry and charge-generation dynamics that do not require avalanche or gain mechanisms to produce detectable signals. These features can lead to improved resolution in the detection of particles having high enough specific energy deposition. Also, as will be seen below, the invention in a broad aspect allows for dual-mode detection, in which both photons and electrons generated by the particle interactions are collected and detected.

Figure 1A:
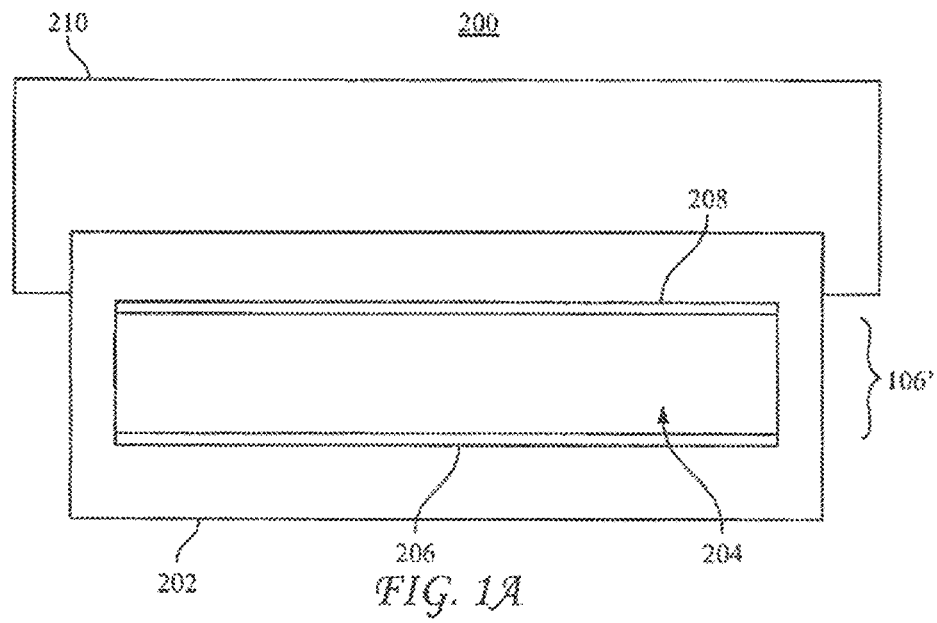
FIG. 1A is a cut-away drawing in side view of an exemplary ion-chamber-based thermal neutron detector according to the present invention.
Figure 1B:
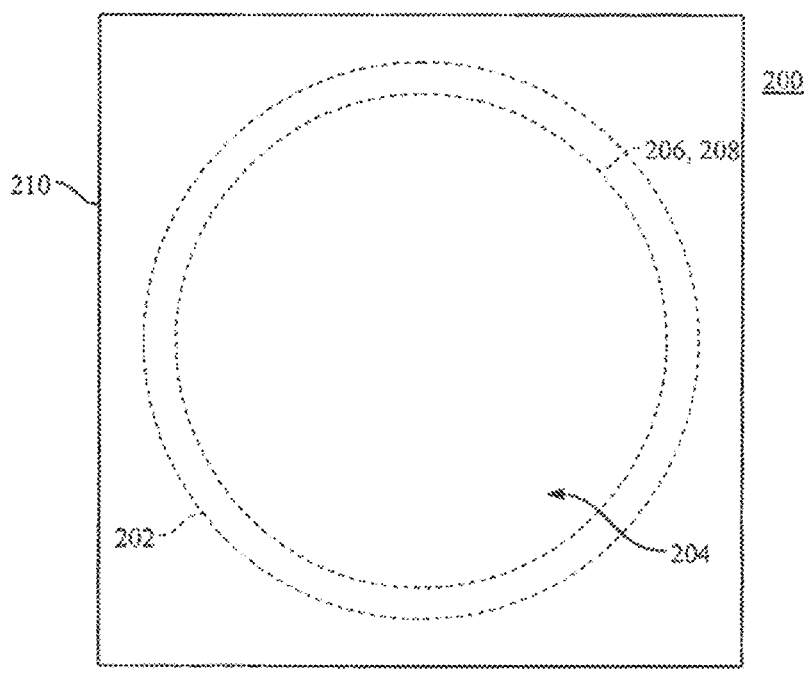
FIG. 1B is a top plan drawing of the exemplary ion chamber based thermal neutron detector of FIG. 2A.

The first of the abovesaid detector embodiments is illustrated as detector 200 of FIGS. 1A and 1B, which shows among other things high pressure ion chamber 202 filled with neutron absorbing material 204, respective bottom and top electrodes 206, 208 formed on opposing surfaces of the ion chamber, and neutron moderating material 210 which may, for example, be polyethylene. The ion chamber is desirably formed of a dielectric material such as silicon or FR4 glass laminate. The neutron absorbing material 204 may comprise one or more of various materials such as helium-3, helium-4, xenon, hydrogen, propane, or methane. For at least some applications, a combination of helium-3 and xenon may be preferable.

To improve the efficiency of the neutron absorbing material 204, we found it desirable for distance 106' between bottom electrode 206 and top electrode 208 to be less than or equal to the 50% attenuation length for thermal neutrons in neutron absorbing material 204 at the chamber pressure. For a similar reason, we found that the area of the cross-section of high pressure ion chamber 202 parallel to electrodes 206, 208 is desirably greater than or equal to 100 times the square of distance 106. Reducing the distance between electrode 206 and electrode 208 also advantageously increases detector sensitivity because it reduces the drift time before the radiation-induced charges are collected and hence reduces the amount of charge that is lost to recombination.

Figure 2A:
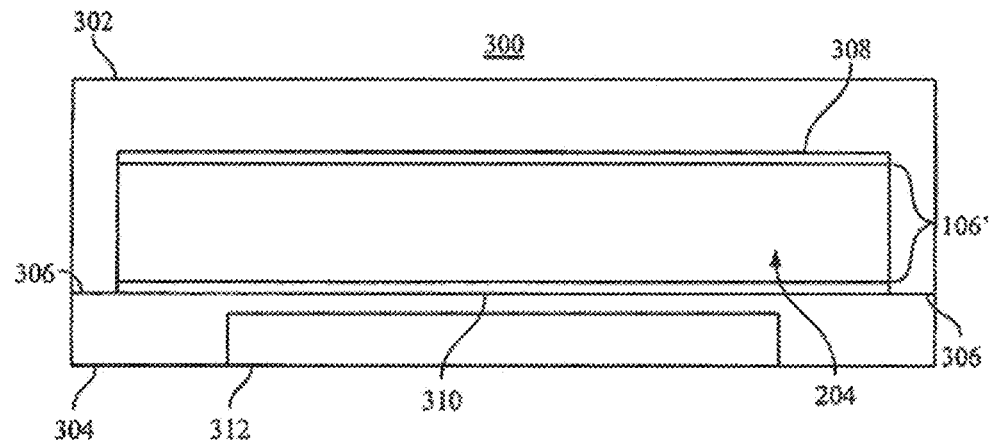
FIG. 2A is a side cut-away drawing of an exemplary ion chamber based neutron detector with monolithically integrated readout circuitry according to the present invention.
Figure 2B:
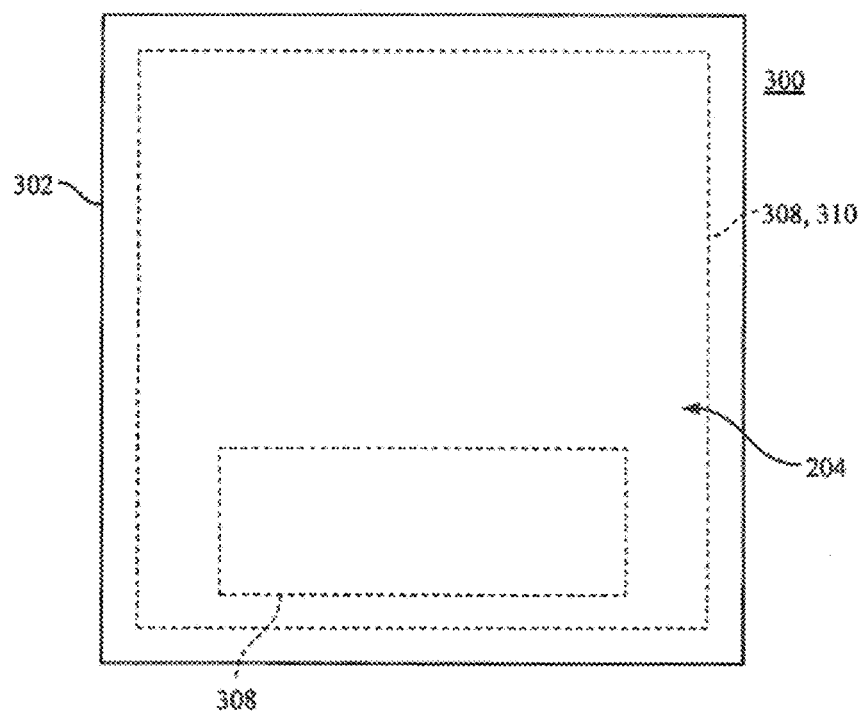
FIG. 2B is a top plan drawing of the exemplary ion chamber based neutron detector of FIG. 3A.

The second of the abovesaid embodiments is illustrated as detector 300 of FIGS. 2A and 2B. As seen in the figures, the detector includes an ion chamber formed in a bonded semiconductor die and further includes monolithically integrated readout circuitry 312. The bonded semiconductor die is formed by bonding etched semiconductor substrate 302 to active semiconductor substrate 304 at bond points 306. The respective bonded portions of the semiconductor die are exemplarily formed of silicon or of silicon-based materials. In one exemplary embodiment, etched semiconductor substrate 302 is formed of silicon and active semiconductor substrate 304 is a silicon on insulator (SOI) substrate.

Monolithic integration of the readout circuitry may advantageously reduce the capacitance and hence the noise associated with readout of the charge collected from the reaction particle ion trails of detected neutrons. The use of monolithically integrated readout circuitry can also facilitate the design of a pixelated ion chamber based neutron detector in which a two (or three) dimensional array of individual neutron detectors, such as detector 300, is deployed.

In the abovesaid patent application, we also described a process for making the detector of 2A and 2B. Very briefly, with further reference to the figures, a hollow space which will form the volume of the ion chamber is etched into substrate 302. Top electrode 308 is formed on the top surface of the hollow space. Monolithically integrated readout circuitry 312 is formed in active semiconductor substrate 304 using, e.g., a CMOS or other standard semiconductor fabrication process. Bottom electrode 310 is formed on the opposite surface of active semiconductor substrate 304, which is desirably parallel to the top surface of the hollow space of etched semiconductor substrate 302 after bonding. Bottom electrode 310 may be electrically coupled to monolithically integrated readout circuitry 312 during the fabrication process or in a subsequent processing step. Monolithically integrated readout circuitry 312 is also electrically coupled to top electrode 308.

Figure 3A:
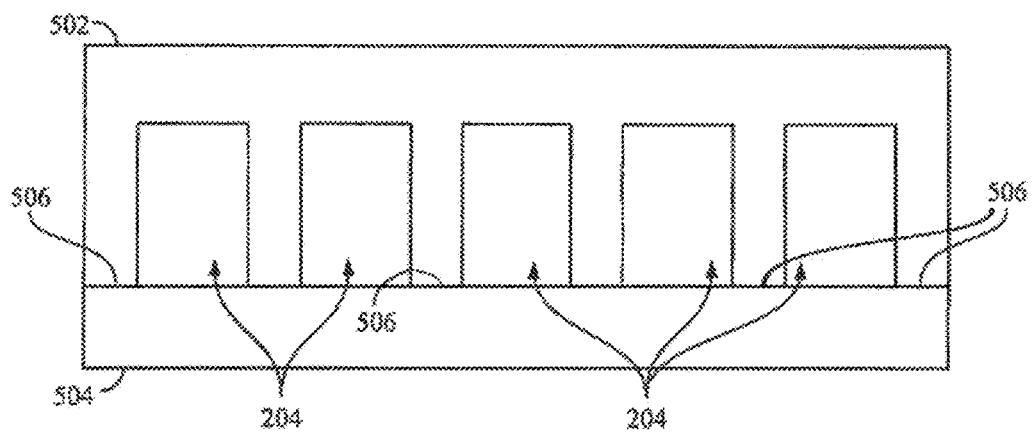
FIG. 3A is a side cut-away drawing of an alternative exemplary ion chamber based neutron detector according to the present invention.
Figure 3B:
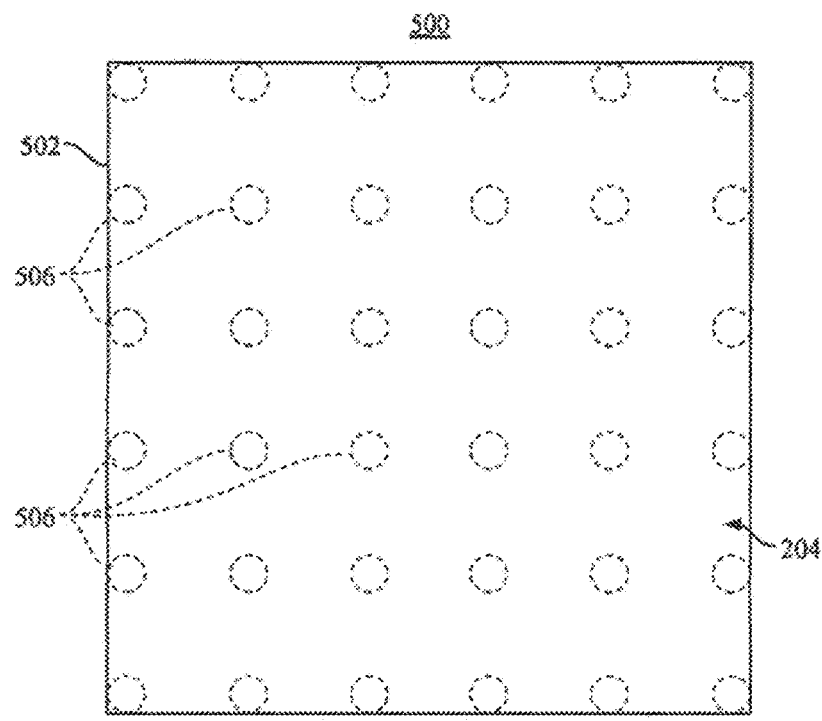
FIG. 3B is a top plan drawing of the alternative exemplary ion chamber based neutron detector of FIG. 5A.

In the abovesaid patent application, we also described an ion chamber design in which an array of columns extended between the two substantially planar major surfaces of the chamber. The purpose of the array of columns was to provide structural support so that the ion chamber could be extended to a relatively large cross-sectional area while still withstanding extremely high internal pressures due to the gas fill. FIGS. 3a and 3b illustrate such a design, in which chamber 500 is formed by bonding etched die portion 502 to flat die portion 504 at bond points 506. Etched die portion 502 is etched to include the array of columns.

Those skilled in the art will understand from the foregoing description that by applying the principles described there, it will be possible to create a sensor in which a layer of radiation-sensitive material is juxtaposed to a substantially parallel layer on which is disposed electronic circuitry for detecting the response of the sensitive material to impinging radiation. Referring back to sensor 300 of FIGS. 2A and 2B, for example, it will be understood that the ion chamber substantially occupies a cavity etched in substrate 302, and that the readout circuitry is disposed on substrate 304. The respective substrates are substantially parallel and are bonded together. It will also be appreciated that the readout circuitry is closely coupled, in the geometrical sense, to the ion chamber, since it is separated therefrom by no more than the thickness of substrate 304.

In the following discussion, we will use the term "layered sensors" to refer generally to sensor architectures in which a layer of radiation-sensitive material (also referred to herein as the "sensing medium") is juxtaposed to a substantially parallel layer on which is disposed electronic circuitry for detecting the response of the sensitive material to impinging radiation, and in which the detection circuitry is separated from the radiation-sensitive material by no more than a substrate thickness.

Some potential benefits of layered sensors that we have been exploring include the possible use of exotic semiconductor media such as uranium dioxide and uranium metal, the use of gaseous or liquid media such as helium gas and pressurized or liquefied xenon for selectable detector operation in ionization or proportional counter modes, the use of advanced sensor electronics offering low noise and the potential for a wide range of timing and pulse-shape-analysis options, and customizable sensor geometries ranging from small to large total volumes.

One particular advantage that layered sensor architectures may offer is the ability to subdivide the energy deposition volume into numerous spatially separated energy deposition regions. Each such region may be integrated with a respective electronic element to define an individual pixel of a one-dimensional or two-dimensional pixel array, or to define an individual voxel of a three-dimensional voxel array. A great deal of information about the incident radiation may be gained by collecting and processing information representing the respective amounts of energy deposited in the various array elements, together with the timing of the individual energy-deposition events.

We have developed further approaches to the design of layered sensors, which we will now describe.

Figure 2C:
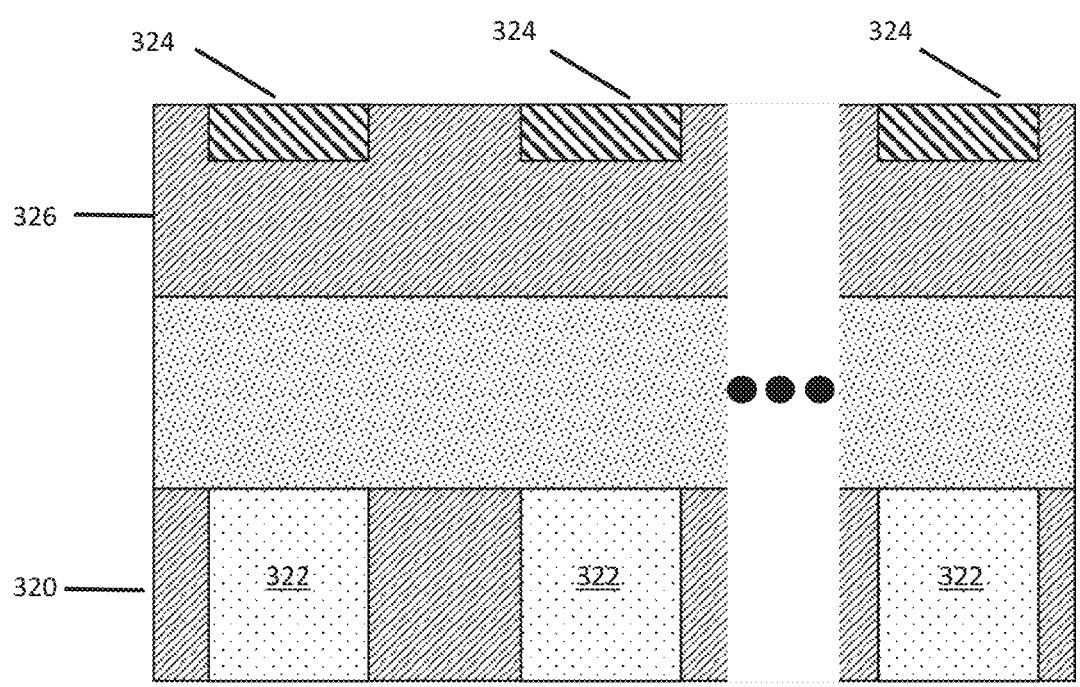
FIG. 2C shows an embodiment in which respective sensor layers are formed in a silicon-on-insulator wafer in which the handle layer has cavities filled with radiation-sensitive material and electronic circuitry is formed on the device layer.

In one such approach as shown in FIG. 2C, the respective sensor layers are formed in a silicon-on-insulator (SOI) wafer. The handle layer 320 is etched to form cavities 322 that are filled with the radiation-sensitive material, and the electronic circuitry 324 is formed on the device layer 326 (which is also sometimes referred to as the "epilayer" or the "SOI layer"). A typical SOI wafer useful for this purpose would be six inches in diameter and 700 µm in total thickness.

In an alternative layered arrangement, a semiconductor substrate on which electrodes and detector circuitry have been formed is juxtaposed to an external layer of radiation sensitive material which may be formed, e.g., as a coating on a separate substrate or as an independent sheet of material.

In either type of arrangement, electrodes can be juxtaposed to the sensing medium either by mechanical placement or by lithographic patterning of a substrate surface that faces the radiation-sensitive material.

Figure 4:
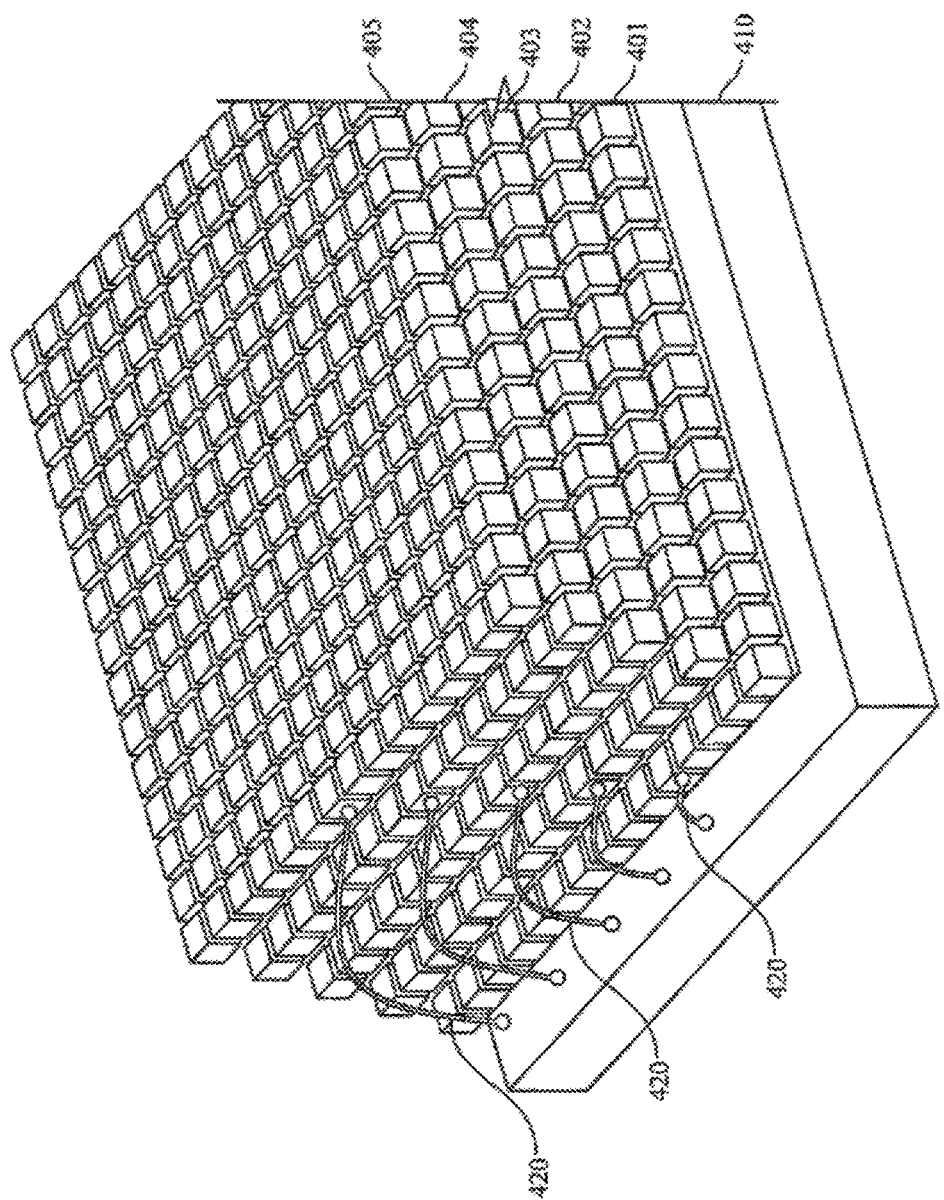
FIG. 4 provides a notional representation of a 3D detector array in which multiple layers, each containing a 2D array of silicon-based pixels, are stacked together.

Moreover, electrical contacts can be placed so as to facilitate the stacking of two-dimensional pixel arrays to form three-dimensional (3D) arrays. FIG. 4, for example, provides a notional representation of such a 3D array, in which, illustratively, five layers 401-405, each containing a 2D array of silicon-based pixels, are stacked together and supported by a motherboard 410, to which they are electrically connected by wirebonds 420 between the motherboard and contact pads at the edges of the respective layers. Within each layer, the pixels may be formed on the surface of a common wafer which also contains on-board processing electronics for that layer. Alternatively, the respective pixels may be formed on individual silicon chips that are bonded, exemplarily by flip-chip attachment, to a common substrate that likewise may contain on-board processing electronics.

Figure 5:
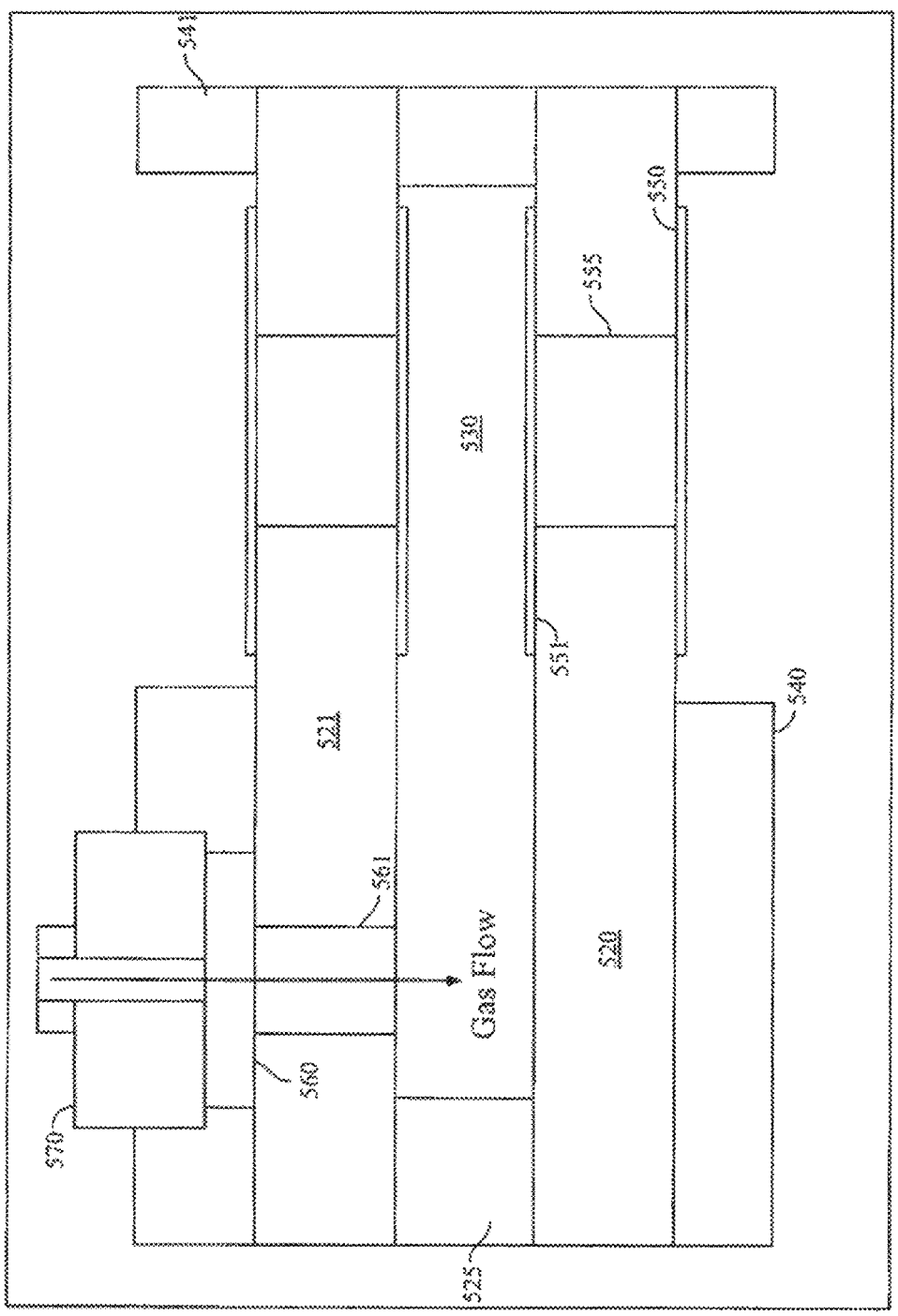
FIG. 5 provides a cross-sectional view of one illustrative layered sensor that has been configured for containment of a liquid or gaseous sensing medium.

FIG. 5 provides a cross-sectional view of one illustrative layered sensor that has been configured for containment of a liquid or gaseous sensing medium. As seen in the figure, a pair of high-resistivity silicon cover layers 520, 521 are spaced apart and supported by an insulating spacer 525 of, e.g., annular conformation that is contained between them, so as to define a cavity 530 to be filled with the fluid sensing medium. A pair of outer plates 540, 541 provide mechanical protection and shielding, if required. Each cover layer has a pair of inner and outer metallized regions 550, 551 that provide electrodes or electrical contacts, and that are joined together by a metal feedthrough 555, as was required for electrical connectivity because of the high resistivity of the silicon layers. A threaded aperture 560 in one of the outer plates, together with a concentric aperture 561 in the adjacent cover layer, provides an inlet for filling the cavity with the sensing medium. A fitting 570, such as a bulkhead gas fitting, may be mounted in the apertured outer plate. A fill tube (not shown), such as a $\frac{1}{16}^{th}$-inch stainless steel gas capillary, may be mated to the fitting. In a prototype that we constructed and tested, the detector electronic circuitry was placed in a discrete external package.

Figure 6:
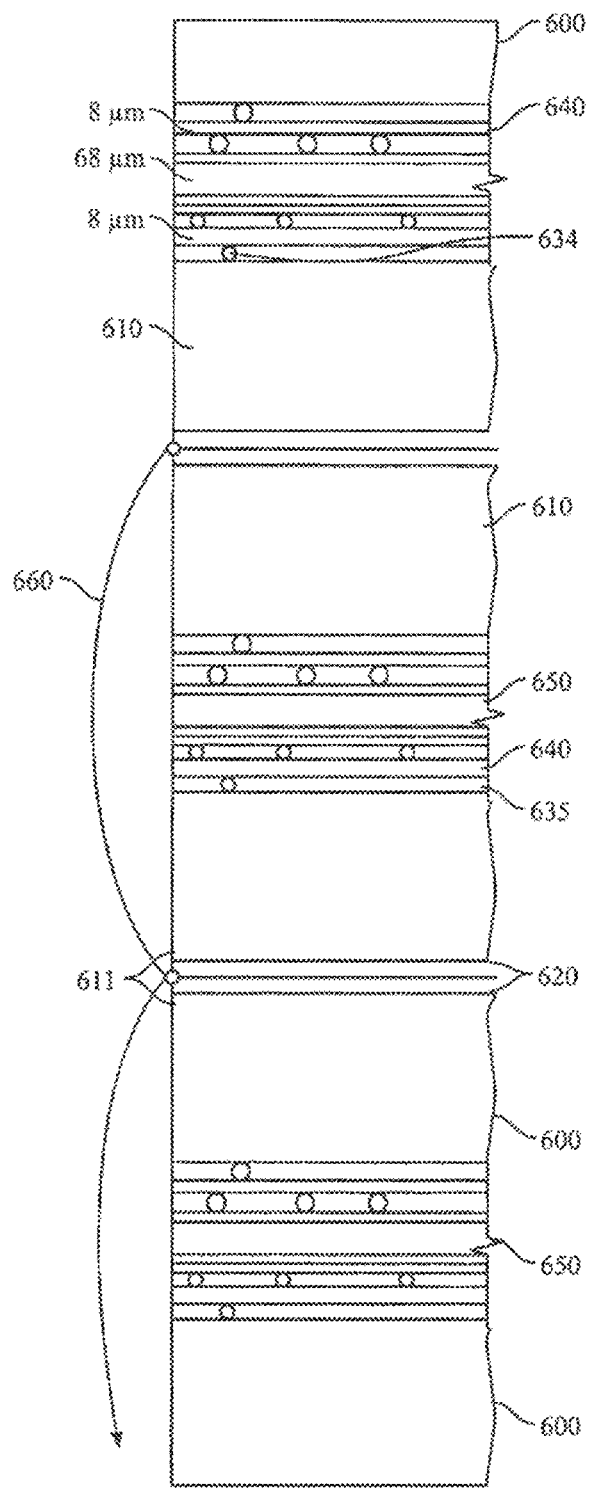
FIG. 6 provides a cross-sectional view of a stack of illustrative layered sensors that include wafers of a semiconductive radiation-sensitive medium.

FIG. 6 provides a cross-sectional view of a stack of illustrative layered sensors. Each stage in the stack of FIG. 6 is similar to one instantiation of the sensor of FIG. 5. As shown in the figure, wafers 600 of a semiconductive radiation-sensitive medium are provided. One such medium is thallium bromide (TlBr), which is a semiconductor with a bandgap somewhat over 4 eV and which is a known scintillator useful for detection of, among other things, gamma and neutron radiation. In the present context, the TlBr is electrically biased at, e.g., 200V to deplete it of charge carriers and used as a charge-generation detector; that is, neutron-absorption and gamma-absorption events are detected based on the electron-hole pairs that are generated and collected on electrodes within the cavity. Optionally, photodiodes may be included in electronics layers so that scintillation produced by the absorption events can also be detected.

It should be noted in this regard that the oxides of uranium and thorium may also be useful as semiconductive sensor media. Although these materials are radioactive and hence contribute background noise due to their own radioactive emissions, there are techniques for processing and discriminating the background signal. This may be desirable because, aside from the background noise, these materials have very desirable characteristics for pulsed detection, such as is encountered in medical applications, monitoring the health of machinery, nuclear materials surveillance, and oil well logging.

Other radiation-sensitive semiconductors that may be useful as sensor media include cadmium telluride and cadmium zinc telluride.

By way of example, a non-linear filter of the kind designed for the removal of salt-and-pepper noise from images can be used to recognize and cancel the alpha-particle background due, e.g., to the radioactive decay of depleted uranium. The salt-and-pepper effect is due in this instance to the random pattern of detection spikes, e.g. very bright scintillations, caused by the alpha particles. We note in this regard that a kilogram of depleted uranium would provide very roughly one million decays per second. If distributed over a 1000×1000 array of pixels, this amounts to only one decay per pixel per second, on average. The processing of such a low level of activity, corresponding to one Hertz of background noise, would be well within the capabilities of current filter technology.

In the figure, which of course should be understood as merely exemplary and not limiting, six TlBr wafers 600 are shown in a stack. The middle four wafers form two pairs 610, 611, within each of which two wafers are arranged so that backside metallization layers 620 formed on each of the wafers are pressed together and bonded to each other. The stack may be continued by similarly bonding the outermost wafers to further wafers not shown in the figure.

With further reference to the figure, it will be seen that each wafer is bonded to an electronics substrate which may, e.g., be a double-sided or multilayer flex circuit. In our terminology, the "backside" of the wafer is the side that is bonded (if at all) to another wafer, and the "front side" is the side bonded to an electronics substrate. In the example shown in the figure, the front side of each wafer is metallized, patterned, and provided with solder bumps 634 that may be embedded in an underfill layer 635, i.e., an insulative layer used, among other things, for pixel isolation. A substrate 640, e.g. a flex circuit, populated with electronics circuitry specific to that wafer is bonded to the wafer using the solder bumps. The electronics substrates belonging to two adjacent wafers (i.e., "outer substrates") are mutually bonded, from opposite sides, to a further substrate 650 (i.e., an "inner substrate") that has a protruding edge (not shown in the figure) bearing solder pads or other electrical contact pads for external connection, and that may optionally include further processing circuitry. Electrically conductive vias formed in the outer substrates establish electrical connectivity between the wafer on one side of the outer substrate to the inner substrate on its other side.

With still further reference to the figure, it will be seen that the bonded backsides of the wafers are interconnected with wirebonds 660 and energized to, e.g., the 200V level used for biasing the wafers.

For the fabrication of a pixellated array, the electronic circuits may be formed according to known lithographic processing, such as CMOS processing, on one or more silicon or SOI wafers. Solder bumps are added to the wafers, after which they are diced to form individual chips, each corresponding to one pixel. The chips are then bonded, as appropriate, to blocks of the radiation-sensitive medium and to the inner substrates.

Exemplary dimensions for certain features of the arrangement of FIG. 6 are: chip edge length, one inch; chip thickness, 8 μm; solder bump diameter, in the range 8-35 μm; inner substrate thickness, 68 μm; sensing medium thickness, 200 μm.

One alternative semiconductor material that may be substituted in place of TlBr in this context includes boron nitride, which is useful for thermal neutron detection.

Figure 7:
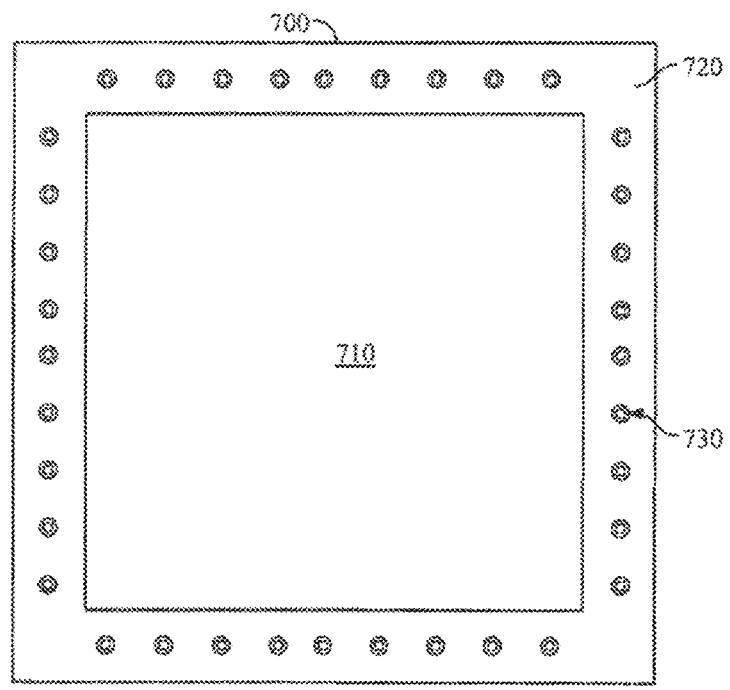
FIG. 7 provides a view of a single detector substrate, containing a 2D array of pixels, that has been configured to be stacked with similar substrates to form a 3D array.

FIG. 7 provides a view of another implementation, in which a single substrate 700, containing a 2D array 710 of pixels (not individually shown), has been configured to be stacked with similar substrates to form a 3D array. The substrate of FIG. 7 is a silicon or SOI substrate in which a border area 720 has been provided with through-silicon vias (TSVs) 730 to provide electrical connectivity from one side of the substrate to the other.

Figure 8A:
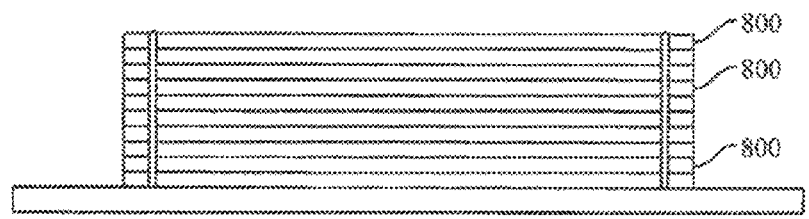
FIGS. 8A and 8B provide a view of an assembly of stacked substrates of the kind shown in FIG. 7.
Figure 8B:
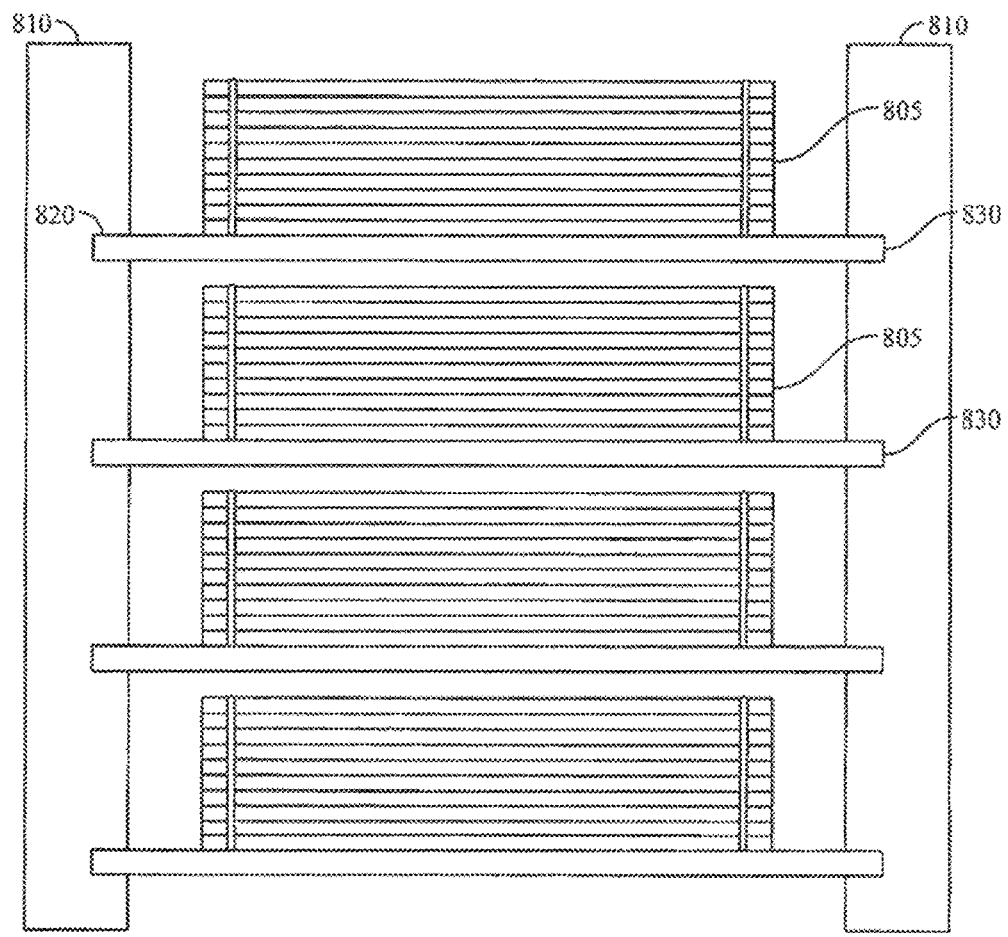

FIG. 8a provides a view of an assembly of, e.g., ten stacked substrates 800 of the kind shown in FIG. 7. Such an assembly can be bonded together and tested. After testing confirms that they operate as specified, a plurality of such assemblies 805 can be bonded to a motherboard 810 as shown in FIG. 8b. Assembly-to-assembly alignment in the vertical direction (as seen in the figure) can be facilitated by precision formed slots 820 on the motherboard wafer.

As seen in FIG. 8b, vertical elements of the motherboard 810 may be paired in order to provide support on two opposing sides of the horizontally-extending (as seen in the figure) substrates. The wide boards 830 seen fitted within slots in the motherboard at the bottom of each stack of ten wafers are useful for cooling. The stack makes external connections via a pattern of pinouts from, e.g., the TSVs depicted in the border area of FIG. 7.

In a pixellated arrangement, each sensor, e.g. each charge-collecting electrode arrangement or each photodiode, advantageously has its own on-board preamplifier, as well as possibly other dedicated circuitry.

In alternative arrangements, a row of pixels may be interrogated by stripline readout, in which pulse timing is related to sequential pixel position. In such arrangements, a single preamplifier may serve an entire row of pixels.

As noted, one advantage of our layered detector architecture is that at least the first stage of the signal-processing electronics can be brought very close to the sensor medium. Advantageously, this first stage includes the first-stage pre-amplifier and the timing electronics. By way of example, circuitry of that kind is readily implemented in the device layer of an SOI wafer. One advantage of such closely geometrically coupled circuitry is an improvement in sensitivity. It should be noted in this regard, however, that silicon and SOI wafers are not the only potentially useful electronics substrates. Other substrate materials potentially useful for that purpose include silicon nitride, silicon carbide, polyimide, and various other polymeric materials useful, e.g., as substrate materials in flex circuits.

As noted, each detector substrate can include on-board circuitry. For a pixellated array, the on-board circuitry can include a processor configured to output two-dimensional image information. If, e.g., the substrate is part of a three-dimensional stack as discussed above, a motherboard (generally to be understood as encompassing any substrate that is orthogonal to the substrates of the stack) can further include a processor that accepts the two-dimensional information from the various substrates and provides three-dimensional image information as output. Such three-dimensional information may include, for example, spatially and temporally resolved information about individual radiation-induced events, and information that tracks the trajectories of individual radioactive particles as they penetrate the stack.

On-board circuitry on an individual substrate or on a motherboard can also include a wireless data-transfer port to facilitate read-out to a smartphone or other wireless terminal.

Another advantage of our layered architecture is that, at least when a gaseous sensor medium is used, it offers the possibility to selectively operate in either an ionization chamber mode or a proportional detector mode. Which mode a particular detector operates in depends on the composition and pressure of the gaseous medium, the electrode geometry, and the operating voltage. Ionization chambers operate in a lower voltage range than proportional detectors. In general, ionization chambers are more sensitive than proportional detectors, but unlike proportional detectors, they are unable to measure particle energy. We believe that layered detectors can be designed, in which the same device can be operated in either mode depending on the gas fill and the operating voltage. With judicious electrode design, we believe it may even be possible to select between modes based solely on the operating voltage.

Another advantage of the layered architecture, which we will discuss in greater detail below, is that it readily lends itself to bimodal, or multimodal, detection schemes in which at the sensor level, different sensor media, having complementary properties, are clustered together, and in which at the detection level, charge-collection circuitry and photonic circuitry can cooperate in a complementary manner.

Figure 9:
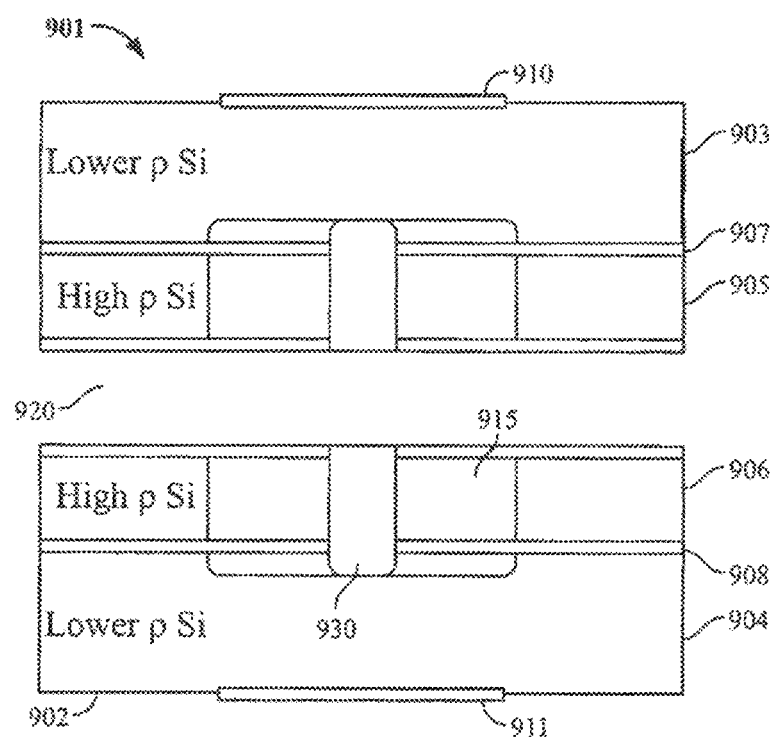
FIG. 9 provides a view of a bonded silicon substrate that has been configured to contain one or more fluid-filled cavities corresponding to respective detector pixels, and further configured so that it can be stacked in an arrangement such as the arrangement of FIGS. 8A and 8B.

Turning now to FIG. 9, shown there is a view of a bonded silicon substrate that has been configured to contain one or more fluid-filled cavities corresponding to respective detector pixels, and further configured so that it can be stacked in an arrangement such as the arrangement of FIGS. 8a and 8b. To form the detector substrate of FIG. 9, two SOI wafers 901, 902 are provided, each including a low-resistivity silicon device layer 903, 904, a high-resistivity silicon handle layer 905, 906, and between the silicon layers, a buried oxide layer 907, 908. The resistivity of the various portions of the SOI wafers may be controlled by ion implantation, for example.

Electrodes 910, 911 are provided on opposing silicon wafer surfaces distal the cavity or cavities 915.

In the view of FIG. 9, the two SOI wafers are shown separated by a pre-assembly gap 920. The two wafers will subsequently be bonded together to form the finished article. It should be noted in this regard that although both the upper and the lower wafer have been etched to form respective half-cells, there may be applications for which it is sufficient to etch only one of the two wafers to form the cavity for the sensor medium. It should also be noted that the cavity depth is a design variable that may be adapted, e.g., to the penetration depth of the particular chosen sensor medium.

In the implementation that is shown in the figure, the handle layer of each SOI wafer is etched to about one-half the desired cavity depth. The respective handle layers are mated to each other to form the full cavities. Prior to assembling the wafers to each other, a thermal oxide layer is formed on each of the mating surfaces. Upon assembly and thermal bonding, the thermal oxide forms the bond between the two SOI wafers.

To facilitate the filling of the cavities with sensor fluid, the cavities are interconnected by etched fill channels 930. Inlet and outlet holes (not shown) for coupling to intake and exhaust manifolds (not shown) are etched into one or both of the SOI wafers.

One advantage of structures such as those shown here is that the detector can be used with interchangeable sensor media. That is, ducts such as the inlet and outlet holes mentioned above can be used to fill the cavities with any of various alternative fluid sensor media, and can even be used to later transfer the selected medium out of the cavities and replace it with a different sensor medium.

The low-resistivity silicon layers serve as the cavity electrodes. We believe it will not be necessary to dice the silicon for this purpose, because the separation between individual electrodes is large relative to the wafer thickness. Because the silicon is relatively resistive, the respective electric fields in such a geometry will remain highly localized, so there will be individual charge collection by the separate electrodes.

We note that in an arrangement in which a pair of electrodes are placed at opposing sides of a sensor medium, it is advantageous for the electrode separation to be less than a charge-carrier absorption depth of the medium.

It should also be noted in this regard that silicon may be replaced by alternative substrate materials such as glass or polymeric materials according to know techniques for the processing of electronic sheet goods. In some implementations, moreover, liquid-phase epitaxy might be useful for filling the cells with sensor medium.

In an exemplary assembly of the kind described above, the high-resistivity silicon layers are 125 µm thick, the low-resistivity silicon layers are 500 µm thick, the oxide layers are 1-2 µm thick, and the electrode diameter is 9 mm. The fill channels are exemplarily 500 µm wide and as deep as the cavities. Etched columns (not shown) are optionally provided between the upper and lower silicon layers for support to strengthen the gas cavities for large-area cells at very high gas pressures.

As shown in the figure, signal-processing circuitry is provided, exemplarily using conventional CMOS fabrication processes, on the surface of one or both device layers. Photodetectors, such as photodiodes, may be incorporated in the circuitry for detection of, e.g., scintillation events.

Figure 10:
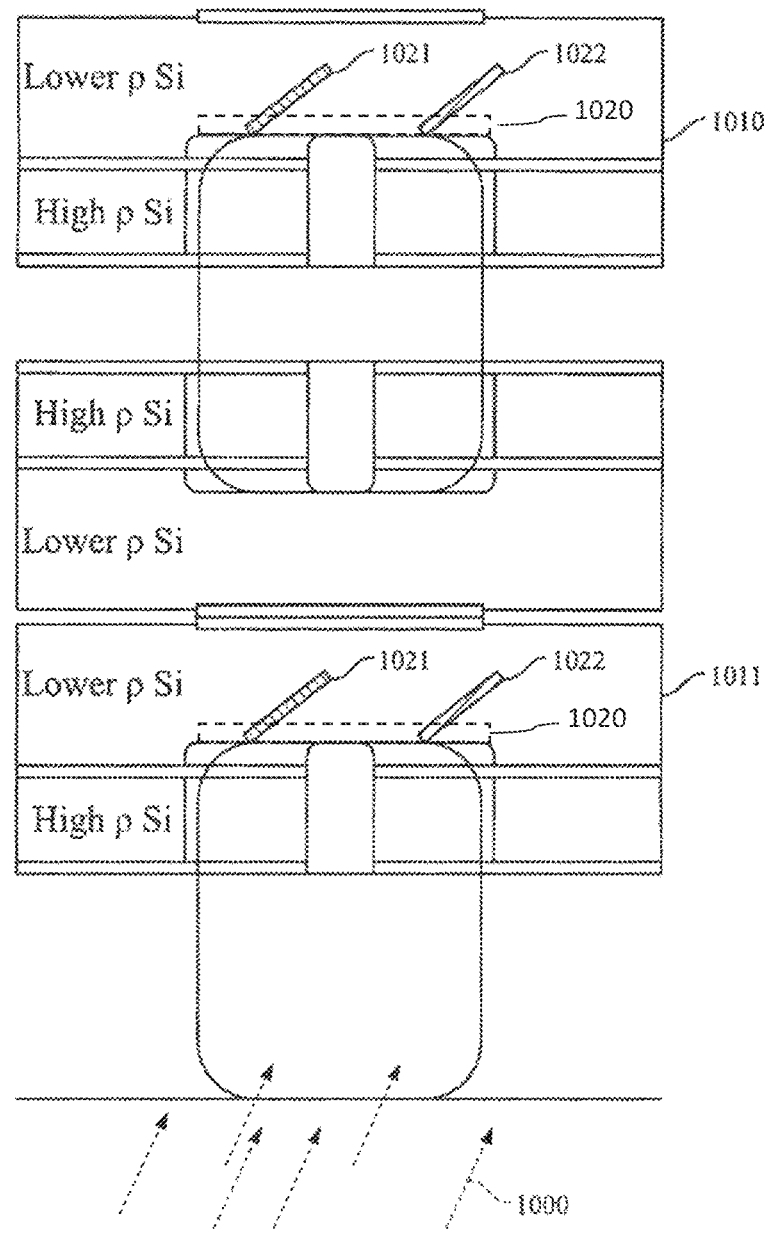
FIG. 10 provides a cross-sectional view of a vertically integrated bimodal detector arrangement.

FIG. 10 provides a cross-sectional view of a detector arrangement that is vertically integrated, i.e., there are multiple (in this case, two) sensor layers that are stacked in the direction of incident radiation. As seen in the figure, the radiation 1000 to be detected is incident from the bottom of the figure, and a detector 1010 for longer-range radiation, such as neutron and gamma radiation, is stacked above a detector 1011 for shorter-range radiation such as alpha and beta radiation and soft x-radiation.

Each sensor layer includes a sensor medium 1020 that scintillates in a manner that at least partially discriminates the type of particle that is detected. Two such scintillators 1021, 1022 are shown schematically in the figure in each sensor layer. To make them visible in the figure, the scintillators have been rotated from their actual, horizontal disposition.

Such scintillator materials are known. For example, U.S. Patent Application Publication 2011/0108738, "Doped Luminescent Materials and Particle Discrimination Using Same," which was filed by F. P. Doty et al. on Nov. 10, 2010 as U.S. patent application Ser. No. 12/943,708 and was published on May 12, 2011, describes scintillating materials that can be used to discriminate between energetic neutrons and gamma ray photons. The entirety of U.S. patent application Ser. No. 12/943,708, which is assigned to the assignee hereof, is hereby incorporated herein by reference.

As explained there, gamma photons tend more to create fast electrons in the sensor medium, whereas neutrons tend more to create recoil protons. The scintillating materials reported by Doty et al. produce at least two types of luminescence which are distinguishable both by their temporal and spectral signatures. One type is fast luminescence associated with the radiative decay of excited singlet states. The other type is delayed luminescence associated with a radiative mechanism for the decay of excited triplet states. The fast luminescence is preferentially excited by fast electrons, whereas the delayed luminescence generally does not vary by particle type. Hence a preponderance of fast luminescence can be taken as an indication of gamma radiation as differentiated from neutron radiation.

The combination of stacked detector layers and particle-discriminating scintillators can provide a high degree of discrimination among particles. That is, the less penetrating particles, i.e. alpha and beta particles, and possibly soft x-rays, will substantially be detected only in the nearer sensor layer. Hence there will be discrimination between two different classes of particle penetration which is independent of discrimination between two different classes based on the type of excitation they provoke. Thus there are four possible combinations of detected results.

Photodiodes may usefully be employed as light detectors to detect the scintillation. If it is desired to discriminate by spectral signature, photodiodes may be made spectrally selective by, e.g., coating optical bandpass filters onto their front (i.e., optical entry) surfaces. Thus, for example, in each of the two sensor layers in FIG. 10, one scintillator medium may be paired with a blue-selective photodiode, and the other scintillator may be paired with a green-selective photodiode.

The two detectors in FIG. 10 are respectively a long-range detector 1010 situated distal the radiation source and a short-range detector 1011 situated proximal the radiation source. The long-range detector is similar to the detector of FIG. 9. The short-range detector is modified from the design of FIG. 9 in that the cavity for the sensor medium is brought closer to the surface proximal the incident radiation field. As shown in the figure, strips of photosensor material, such as blue-sensitive and green-sensitive photosensor material, are optionally provided.

A "multimode" radiation detector combines at least two features of the radiation interaction in order to enhance performance over what is obtainable when only a single feature is detected. We will now describe an embodiment that is "dual channel" or "dual mode" because the sensor is configured with the ability to detect both charge and light. In exemplary implementations, detection of scintillation events is combined with with charge collection, in either ionization mode or proportional mode. Generally, electron generation or charge-pair generation within the sensor material is a direct product of impingement by the radiation to be detected (although of course a secondary avalanche effect is also important for proportional-mode detection), whereas the scintillation light that is detected is the product of a secondary interaction.

Figure 11:
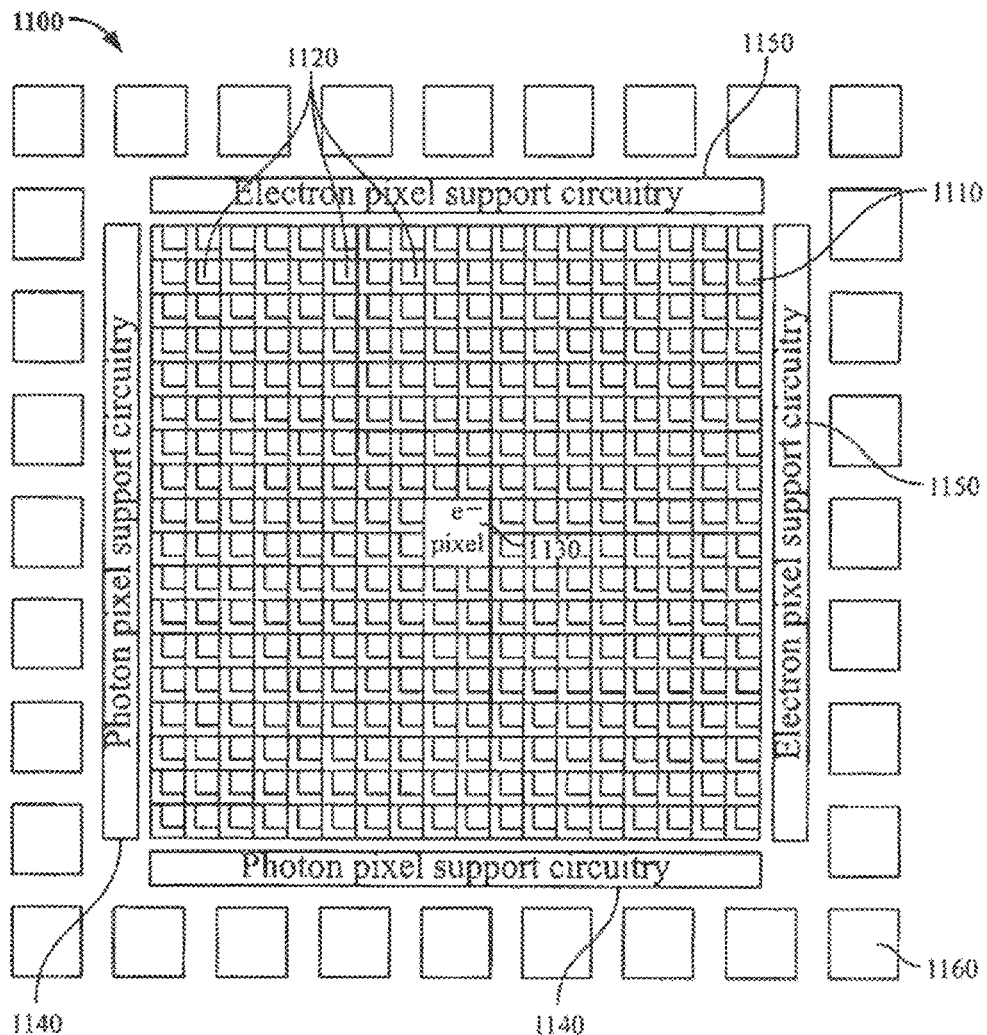
FIG. 11 provides a top-down plan view of a horizontally integrated, two-dimensional, dual channel pixel array for bimodal radiation detection.

The radiation sensor, which includes a sensor medium that may be solid, gaseous, or even liquid, is mated to an Application Specific Integrated Circuit (ASIC) 1100 that incorporates a horizontally integrated dual channel pixel array 1110 as seen, for example, in FIG. 11. The figure depicts a single macropixel comprising multiple channels of sub pixels 1120, denominated "photon micropixels" or "optical sub-pixels", that are photon sensitive, and further comprising a single element 1130, denoted an "electron pixel", for directly collecting charge.

Desirably, the integrated charge on each photon micropixel provides information indicative of photon intensity in a spatially resolved manner. The sub-pixel output signals can be summed off-chip, at the macropixel level, to provide a value of the total equivalent light seen by the macropixel. The respective sub-pixel output signals can also be collectively analyzed to obtain spatial information indicating the location within the macropixel that was impinged by the detected photons. Our design for the photon micropixel is derived from a front-side illuminated CMOS camera design concept that will be familiar to those skilled in the art. The optical signal and the direct-charge signal will typically be processed separately, at least at the first processing level.

FIG. 11 provides an example of a two-dimensional array. Additionally, we believe that 3D arrays are achievable by stacking a plurality of such arrays in a vertical column according, for example, to methods we have described above.

We believe that a dual mode or multimode detector as described here will have useful applications in medical imaging, industrial health monitoring, and national security, among other fields. It will be especially useful for real-time event identification and tracking. In particular, we believe such a detector can be given the ability to distinguish whether a given interaction is due to a photoelectric event, pair-production, or Compton scattering.

The implementation depicted in top-down plan view in FIG. 11 employs front-side illuminated photodiodes, as noted above. We believe that with appropriate changes in the fabrication process, a backside-illuminated implementation would also be possible. Such an implementation might offer the advantage of a higher fill factor for the photonic pixels. In any event, we believe that a front-side illuminated system having an optical pixel fill factor of 80% or even more is achievable.

As seen in the figure, the electron pixel, which is insensitive to photons, is interleaved with the photon sensitive sub-pixels. In the figure view, the observer's line of sight is directed downward toward the face of the charge-collection electrode with which the electron pixel contacts the sensing medium. Charge-readout electronic circuitry is laid out on a pitch to fit under this electrode. The charge-readout circuitry may comprise, e.g., a conventional radiation sensor readout electronics chain, including charge-sensitive amplifier (CSA), shaper amplifier, peak detector, discriminator, and the like. Alternatively, the circuitry may comprise an integrating pixel design adapted to provide image information.

Also seen in the figure are peripheral areas 1140 dedicated to support circuitry for the photon pixels, and similar areas 1150 dedicated to support circuitry for the electron pixel.

Also seen is an outer peripheral region bearing an array of bondpads 1160, such as conventional 100-μm electrical bondpads.

Figure 12:
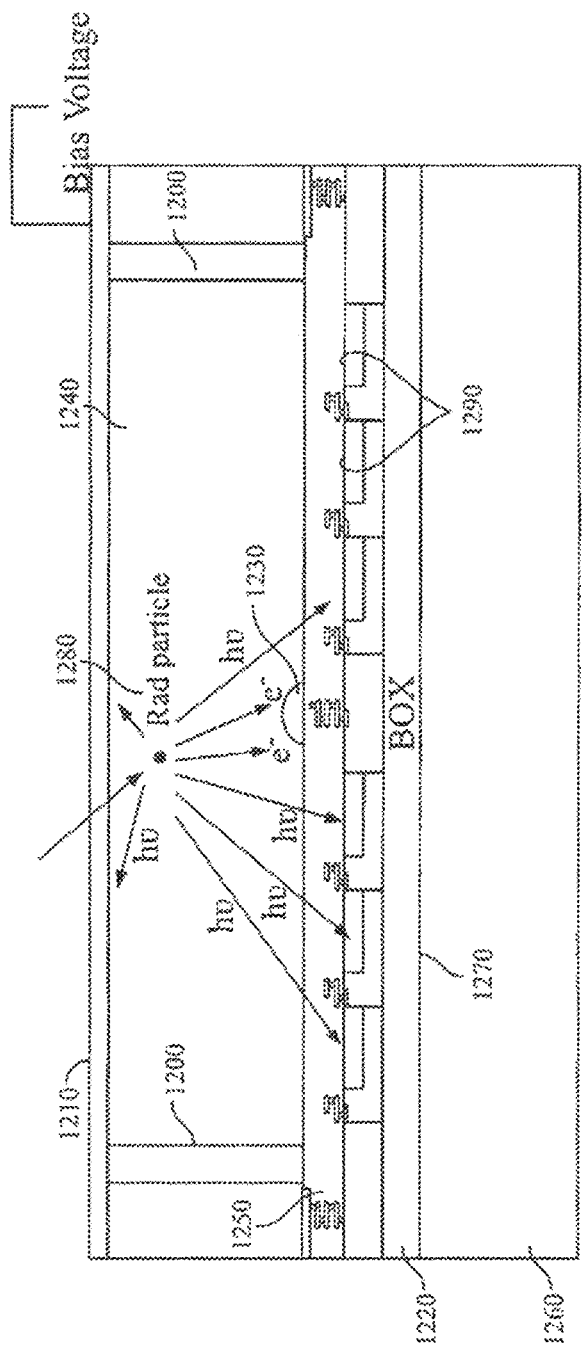
FIG. 12 provides a cross-sectional view of a version of the sensor device of FIG. 11 that has been adapted for a gaseous sensor medium. The figure also schematically depicts a detector event caused by the collision of a particle of radiation in the sensor medium.

FIG. 12 provides a cross-sectional view of a version of the sensor device of FIG. 11 that has been adapted for a gaseous sensor medium. As seen in the figure, this arrangement includes one or more insulating spacers 1200 that separate a top plate 1210, which serves as, e.g., a cathodic sensor electrode from a CMOS substrate 1220 and as such is energized with a bias voltage. As further seen in the figure, the anodic electrode is provided by a large pitch gold solder ball 1230 deposited on a top level bond pad of the CMOS substrate and is typically held at ground level. The cavity 1240 defined between the cathode plate and the CMOS substrate serves as a pressure vessel filled with a gaseous sensor medium such as xenon or helium-4.

Typically, the sensor gas layer will be primarily insulating and hence can cover the bondpads. The application-specific integrated circuit (ASIC) portion 1250 of the device of FIG. 12, including the front-side illuminated photodiodes, the supporting circuitry for the photodiodes and the charge collection, and the gold anode can be made by standard SOI CMOS processes and known extensions thereof. Consistent with standard SOI practices, the device shown in the figure includes a CMOS handle wafer 1260 overlain by a buried oxide (BOX) layer 1270.

FIG. 12 also schematically depicts a detector event caused by the collision of a particle of radiation in the sensor medium. As shown, the collision produces a shower of photons (represented by the symbol hv in the figure), some of which impinge on, and are detected by, the photodiodes 1290. The collision also produces a shower of electrons, some of which are collected by the gold anode.

Figure 13:
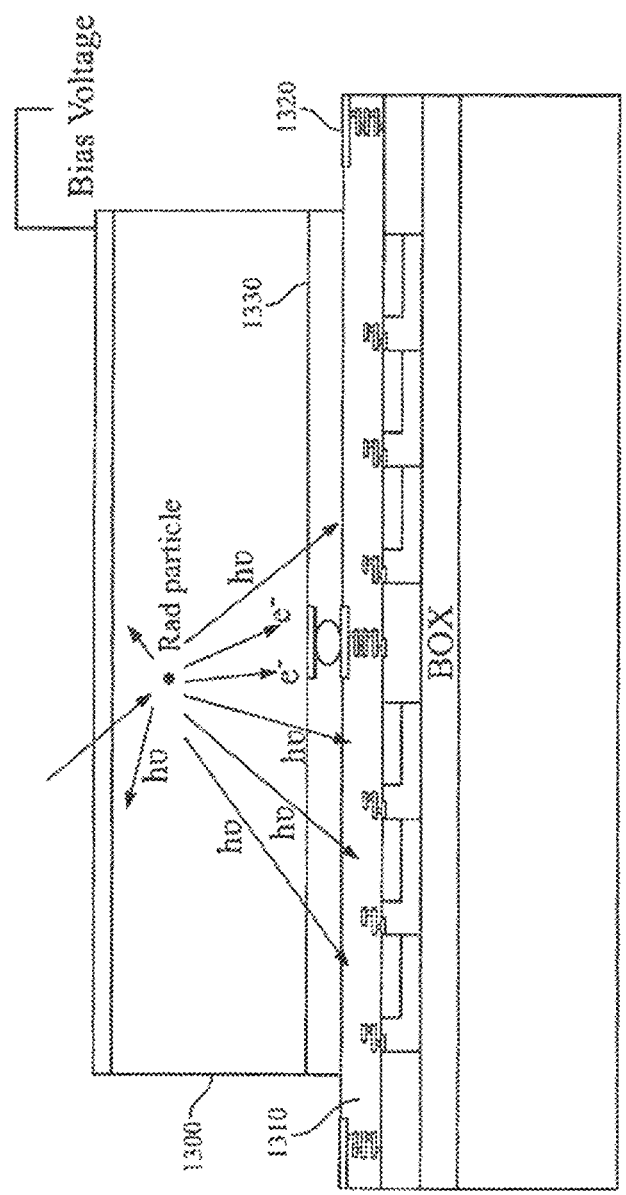
FIG. 13 provides a cross-sectional view of a version of the sensor device of FIG. 11 that has been adapted for a solid sensor medium.

FIG. 13 provides a cross-sectional view of a version of the sensor device of FIG. 10 that has been adapted for a solid sensor medium such as cadmium telluride or cadmium zinc telluride, which are very sensitive media for detecting x-radiation and gamma radiation by direct charge generation, and which have a very favorable electronic mobility-lifetime product, which leads to long path lengths in charge-carrier transport. As seen in the figure, this arrangement includes a block 1300 of sensor material integrated with the ASIC substrate 1310 by flip chip assembly.

Fabrication of the device of FIG. 13 involves certain procedural differences from fabrication of the device of FIG. 12 because the solid sensor medium of FIG. 13 obviates any need for a spacer of the kind used, e.g., to help define the gas cavity of FIG. 12. Because of the different manufacturing methods, the bondpad structures 1320 of the device of FIG. 13 need to be exposed for proper bonding, as shown, and their placement may need to be adapted for such purpose. In addition, an optically transparent underfill 1330 is required to reduce stresses and to facilitate mechanical alignment.

When operating in an imaging mode, the device circuitry will implement an integrating signal detector that accumulates signal energy for specific windows of time. The photonic signal, which consists of amplitude and spatial information integrated over respective such time windows, is read off-chip. In parallel, the charge signal is integrated over the same time windows and read off-chip on a separate channel. The charge signal will provide amplitude information only.

Figure 14:
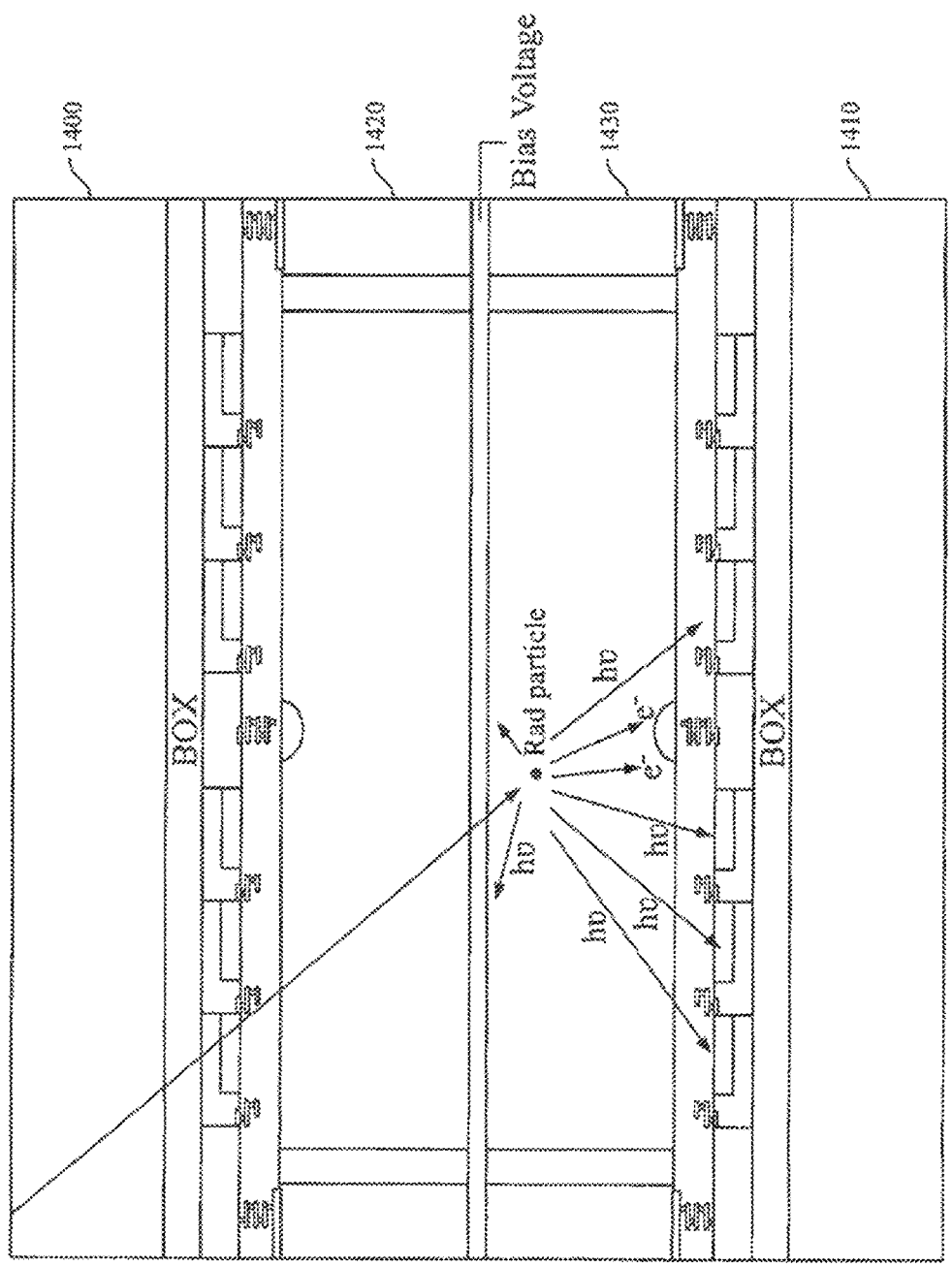
FIG. 14 provides a view of an arrangement in which two detector ASICs of the kind illustrated in FIG. 12 are joined together for greater photon-collection efficiency.

In typical detection events, the generated photons are emitted into a full sphere. For greater collection efficiency, it is therefore advantageous to add a second detector ASIC 1400, symmetrically placed relative to the first detector ASIC 1410, with the respective sensor media 1420, 1430 proximal one another. Such an arrangement is provided in FIG. 14.

Figure 15:
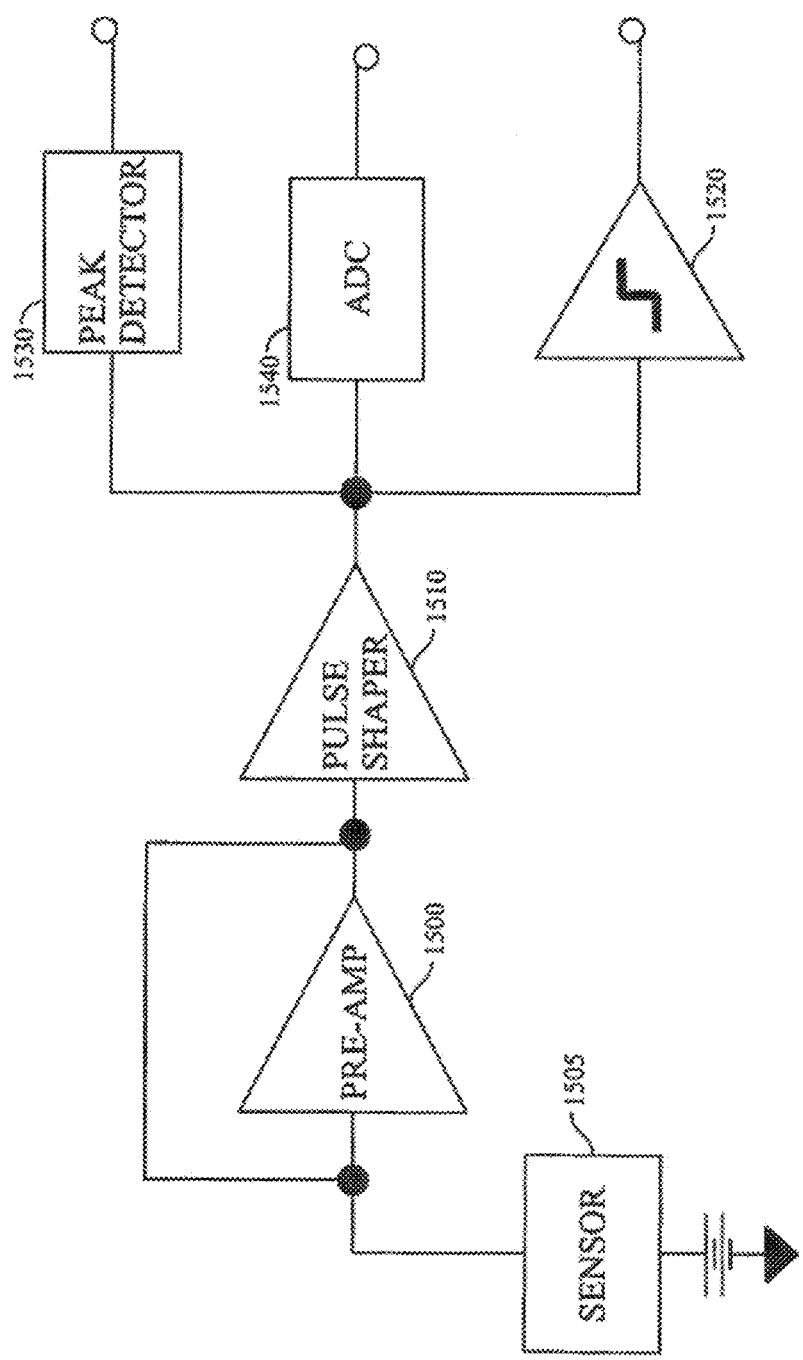
FIG. 15 provides a high-level schematic representation of an illustrative on-board pre-amplifying and pulse-shaping circuit for a pixel according to the invention in some embodiments.

As noted above, on-board circuitry is advantageously included on the detector substrates, including at least a preamplifier for each pixel or, in some implementations, for each group of pixels. FIG. 15 shows one example of such a dedicated circuit in high-level schematic representation. As seen in the figure, the exemplary circuit includes a preamplifier 1500 connected to sensor 1505, a pulse-shaping amplifier 1510, and according to various options may include any of an analog comparator 1520, an analog peak detector 1530, and an analog-to-digital converter 1540.

We claim:

1. Radiation detection apparatus, comprising:
   a silicon or silicon-on-insulator (SOI) substrate;
   at least one sensor medium disposed at least partially within a cavity in the silicon or SOI substrate; and
   an electrode arrangement for collecting charge generated within the sensor medium by interactions with impinging radiation and drifted through the sensor medium;
   wherein:
   the electrode arrangement comprises at least one silicon charge-collection electrode;
   the at least one silicon charge-collection electrode is a silicon portion of the substrate that is doped to increase its electrical conductivity and that constitutes a wall portion of the cavity; and
   the electrode arrangement is configured to produce an output signal that is detectable by an electronic signal-processing circuit when the sensor is stimulated by a product of an interaction between the sensor medium and impinging radiation.

2. The apparatus of claim 1, wherein the at least one sensor medium comprises two or more sensor media, each of which is at least partially disposed within a respective one of a plurality of cavities in the substrate, and wherein each said cavity has a respective said electrode arrangement.

3. The apparatus of claim 1, wherein the substrate is an SOI substrate comprising a device layer and a handle layer, the cavity is formed in the handle layer, and at least one said silicon charge-collection electrode is defined in the device layer.

4. The apparatus of claim 1, comprising a first and a second silicon or SOI substrate, wherein a respective portion of the cavity is defined within each of the substrates, and wherein the first and second substrates are bonded together.

5. The apparatus of claim 1, wherein at least a portion of the signal-processing circuit is formed on the substrate.

6. The apparatus of claim 1, wherein the signal-processing circuit comprises a preamplifier formed on the substrate.

7. The apparatus of claim 1, wherein the sensor medium comprises a gas or a liquified gas.

8. The apparatus of claim 1, wherein the sensor medium comprises a semiconductor.

9. The apparatus of claim 1, wherein the sensor medium comprises at least one material from the group consisting of hydrogen, deuterium, helium, krypton, xenon, boron, cadmium telluride, cadmium zinc telluride, thorium oxide, uranium oxide, propane, methane, and thallium bromide.

10. The apparatus of claim 1, wherein:
    the substrate is an SOI substrate comprising a silicon layer and a silicon oxide layer;
    the electrode arrangement comprises a pair of electrodes respectively positioned on opposing sides of the cavity;
    the silicon oxide layer provides electrical isolation between the pair of electrodes; and
    at least one of the electrodes is a said silicon charge-collection electrode.

11. The apparatus of claim 1, wherein the substrate is an SOI substrate comprising a device layer and a handle layer, and wherein the cavity is formed in the handle layer.

12. The apparatus of claim 1, further comprising a photodiode optically coupled to the cavity.

13. The apparatus of claim 1, conformed as a pixel in an imaging array.

* * * * *